(12) United States Patent
Yamamoto

(10) Patent No.: US 8,342,704 B2
(45) Date of Patent: Jan. 1, 2013

(54) LIGHTING DEVICE, DISPLAY DEVICE AND TELEVISION RECEIVER

(75) Inventor: Kaori Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 172 days.

(21) Appl. No.: 12/867,769

(22) PCT Filed: Jan. 26, 2009

(86) PCT No.: PCT/JP2009/051216
§ 371 (c)(1),
(2), (4) Date: Aug. 16, 2010

(87) PCT Pub. No.: WO2009/107433
PCT Pub. Date: Sep. 3, 2009

(65) Prior Publication Data
US 2010/0328557 A1   Dec. 30, 2010

(30) Foreign Application Priority Data
Feb. 27, 2008   (JP) ................. 2008-046628

(51) Int. Cl.
*G09F 13/04* (2006.01)
*G09F 13/08* (2006.01)
*F21V 7/04* (2006.01)
*F21S 4/00* (2006.01)

(52) U.S. Cl. ....... 362/97.2; 362/97.1; 362/632; 362/223

(58) Field of Classification Search .......... 362/606, 362/607, 613, 614, 632, 633, 634, 97.1, 97.2, 362/223, 224, 225; 349/58, 60, 64
See application file for complete search history.

(56) References Cited

U.S. PATENT DOCUMENTS

| | | | | |
|---|---|---|---|---|
| 7,224,416 | B2 * | 5/2007 | Cha et al. ........................ | 349/60 |
| 7,324,174 | B2 * | 1/2008 | Hafuka et al. .................. | 349/61 |
| 7,379,128 | B2 * | 5/2008 | Tsubokura et al. ............. | 349/60 |

(Continued)

FOREIGN PATENT DOCUMENTS

JP   2002-279820 A   9/2002
(Continued)

OTHER PUBLICATIONS

Official Communication issued in International Patent Application No. PCT/JP2009/051216, mailed on Apr. 14, 2009.

*Primary Examiner* — David Crowe
(74) *Attorney, Agent, or Firm* — Keating & Bennett, LLP

(57) ABSTRACT

A lighting device 12 of the present invention includes a light output portion 15z from which light is output, a light source 17, and an optical member 15b provided on the light output portion 15z side with respect to the light source 17. The optical member 15b is held by a pair of holding members. The holding members include a first holding member 15a that holds the optical member 15b from the light source 17 side and a second holding member 16 that holds the optical member 15b from an opposite side from the light source 17 side. A buffer 70 is provided in at least one of a space between the optical member 15b and the first holding member 15a and a space between the optical member 15b and the second holding member 16. The buffer 70 has at least one rough surface on a side that abuts the optical member 15b.

9 Claims, 12 Drawing Sheets

U.S. PATENT DOCUMENTS

| | | | |
|---|---|---|---|
| 7,637,641 B2 * | 12/2009 | Choi et al. | 362/346 |
| 7,824,050 B2 * | 11/2010 | Tsai et al. | 362/97.4 |
| 7,920,225 B2 * | 4/2011 | Nishikawa et al. | 349/60 |
| 2005/0088809 A1 | 4/2005 | Nakagawa et al. | |
| 2007/0188675 A1 * | 8/2007 | Tsubokura et al. | 349/58 |

FOREIGN PATENT DOCUMENTS

| | | |
|---|---|---|
| JP | 2005-106858 A | 4/2005 |
| JP | 2007-193238 A | 8/2007 |
| JP | 2007-279437 A | 10/2007 |

* cited by examiner

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a liquid crystal television does not emit light, and thus a backlight device is required as a separate lighting device. The backlight device is arranged behind the liquid crystal panel (i.e., on a side opposite from a display surface side). The backlight device having a plurality of linear light sources and a diffuser sheet (optical member) that is provided on a light output side of the linear light sources has been known (see Patent Document 1).
[Patent Document] Japanese Unexamined Patent Publication No. 2007-279437

Problem to be Solved by the Invention

Patent Document 1 discloses a lighting device having a chassis, a reflecting sheet provided in the chassis and a diffuser sheet provided on the light emission side of the reflecting sheet. A surface of the diffuser sheet arrangement portion of the reflecting sheet is formed to be rough to reduce friction resistance with the diffuser sheet. Therefore, if the diffuser sheet is expanded due to heat that is generated in the device, the diffuser sheet freely slides on the diffuser sheet arrangement portion. This prevents deflection of the diffuser sheet and power is not stored there.

By making the surface of the reflecting sheet to be rough, the friction resistance with the diffuser sheet is surely reduced. However, the friction resistance between the reflecting sheet and the diffuser sheet is originally not so great and therefore, it hardly causes great deflection.

However, it is a fact that the optical member such as the diffuser sheet is easy to be flexed and great deflection may be caused according to its arrangement state or the friction resistance at the contact portion. Further, in a case in that the optical member such as the diffuser sheet is held between some components as disclosed in Patent Document 1 and the friction resistance between the components is simply reduced, rattling is caused between the holding members and problems such as generation of a position gap or occurrence of impact noise may be caused.

DISCLOSURE OF THE PRESENT INVENTION

An object of the present invention is to provide a lighting device having an optical member on a light output side with respect to a light source, the lighting device in which the optical member is stably held preferably restricted from bending that may be caused by heat produced by the light source. Another object of the present invention is to a display device including such a lighting device, and a television receiver including such a display device.

Means for Solving the Problem

To solve the above problem, the present invention provides a lighting device having a light output portion from which light is output, and the lighting device includes a light source and an optical member provided on the light output portion side with respect to the light source. The optical member is held by a pair of holding members. The holding members includes a first holding member that holds the optical member on the light source side and a second holding member that holds the optical member on an opposite side from the light source side. A buffer is provided in at least one of a space between the optical member and the first holding member and a space between the optical member and the second holding member. The buffer has at least one rough surface on a side that abuts the optical member.

According to the present invention, the buffer is provided between the optical member and one of the holding members that hold the optical member. This enables the optical member to be held without rattling and eases impact noise or the like that may be caused between the optical member and the holding members. Since the buffer is provided to ease impact or shock caused between two components (the optical member and the holding member, for example), it is formed of an elastic material having modulus of elasticity higher than the two components. However, such an elastic material generally has great friction coefficient. Therefore, if the buffer is provided on the optical member with surface contact (flat surface), friction between the two components increases and the optical member is not able to move freely (free movement (contraction or expansion) of the optical member is restricted). In the present invention, the surface of the buffer that comes in contact with the optical member is formed to be a rough surface such that no rattling is caused between the holding member and the optical member and the optical member is allowed to move freely to some extent. Therefore, if the optical member is contracted or expanded due to heat from the light source, deflection is not caused in the optical member. The term "rattling" here means a phenomena in which a gap is caused between the two components due to a dimension error for example and the two components rattle due to the gap.

BEST MODE FOR CARRYING OUT THE INVENTION

First Embodiment

The first embodiment of the present invention will be explained with reference to the drawings.

Figure 1:
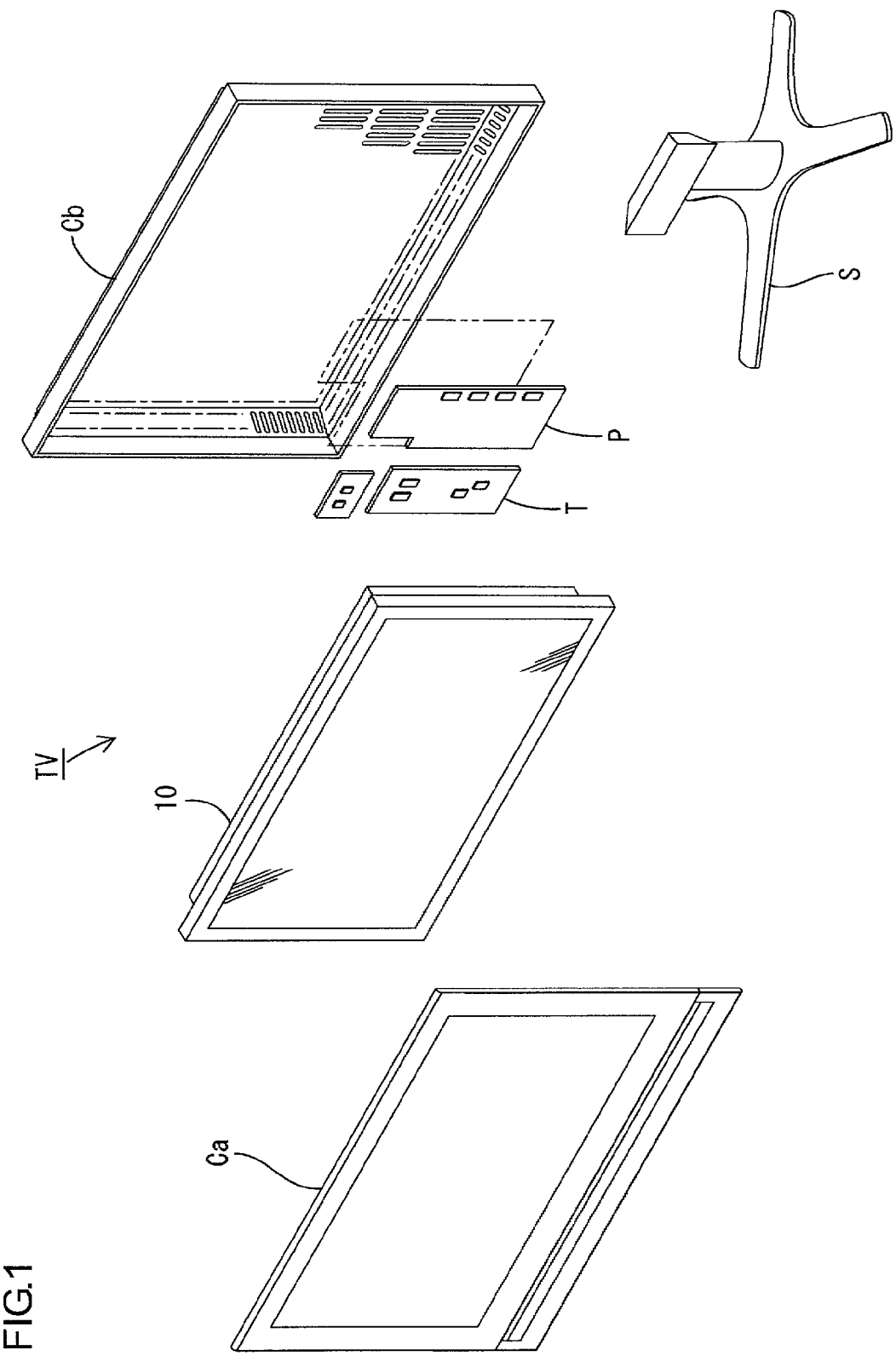
FIG. 1 is an exploded perspective view illustrating a general construction of a television receiver according to a first embodiment of the present invention.
Figure 2:
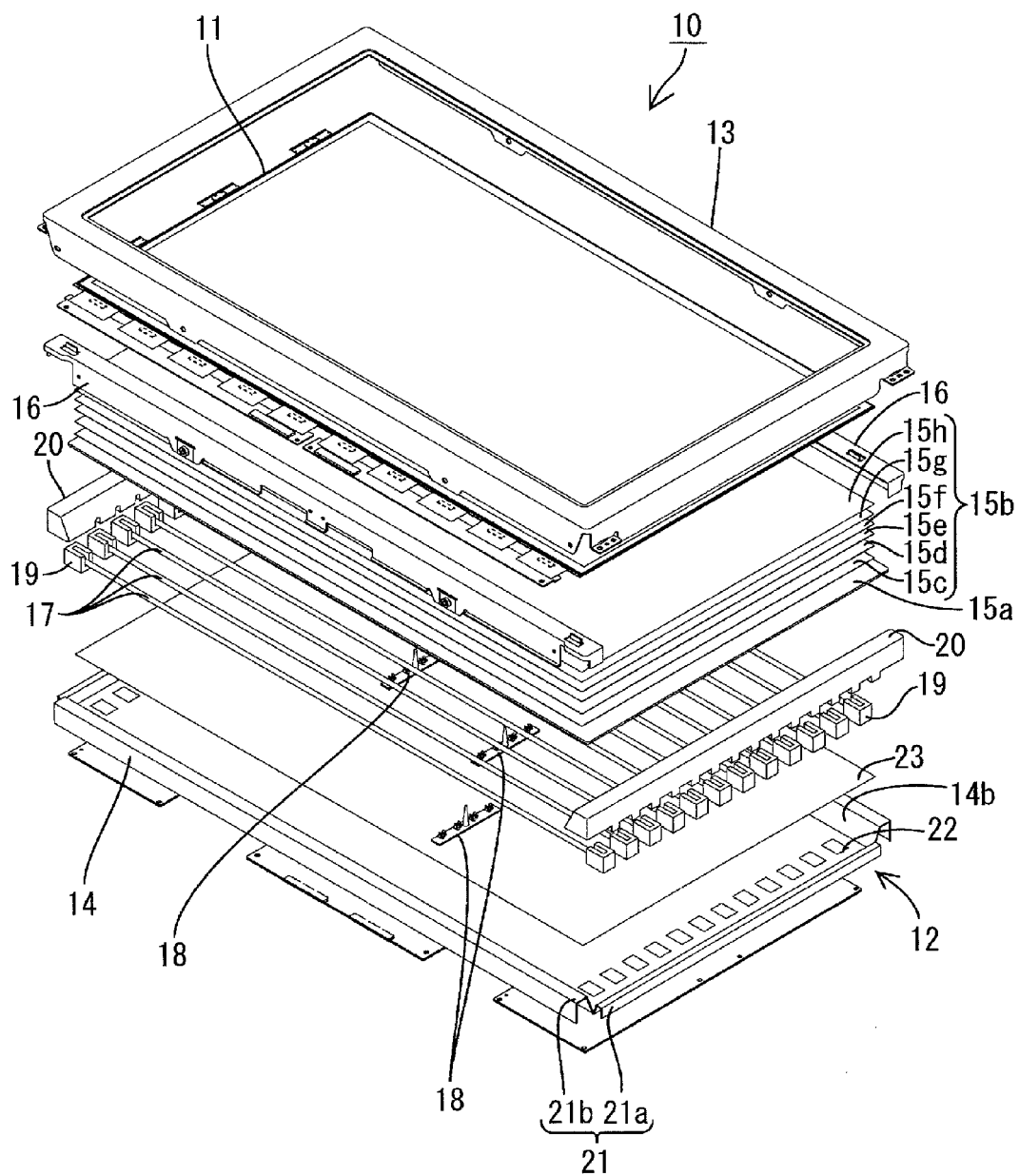
FIG. 2 is an exploded perspective view illustrating a general construction of a liquid crystal display device provided in the television receiver in FIG. 1.
Figure 3:
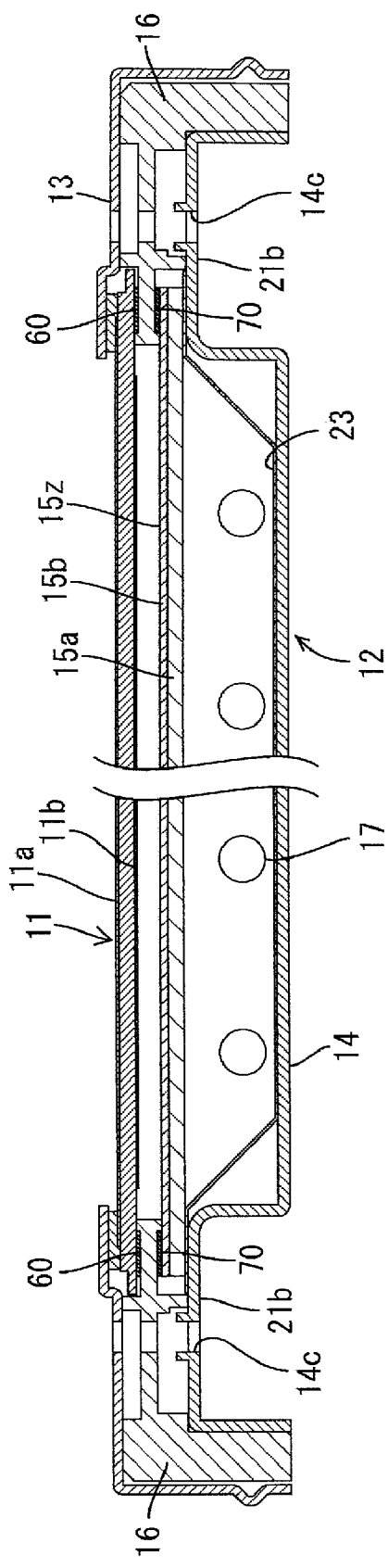
FIG. 3 is a cross-sectional view illustrating a cross-sectional configuration of the liquid crystal display device in FIG. 2 along the short-side direction.
Figure 4:
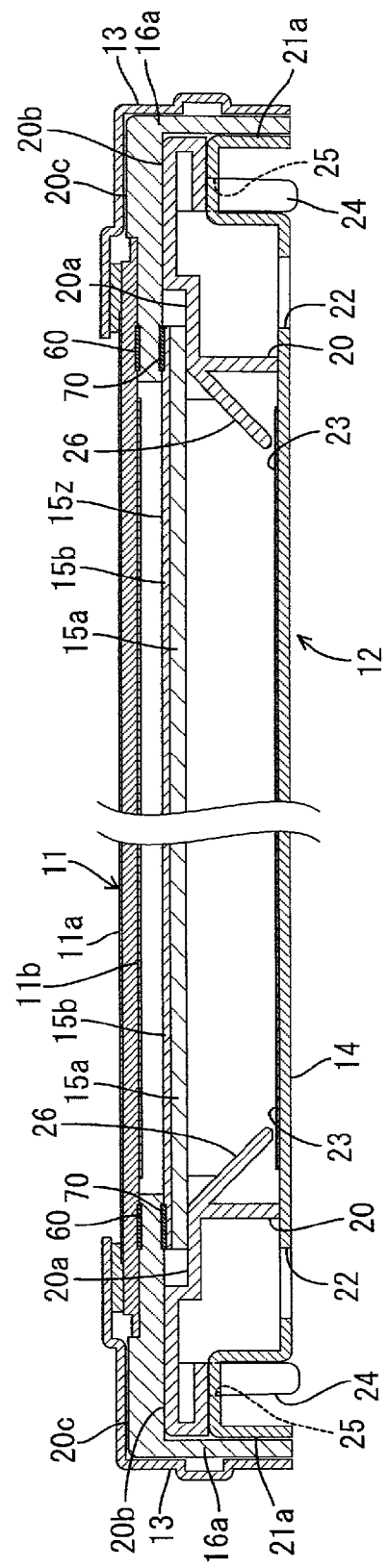
FIG. 4 is a cross-sectional view illustrating a cross-sectional configuration of the liquid crystal display device in FIG. 2 along the long-side direction.
Figure 5:
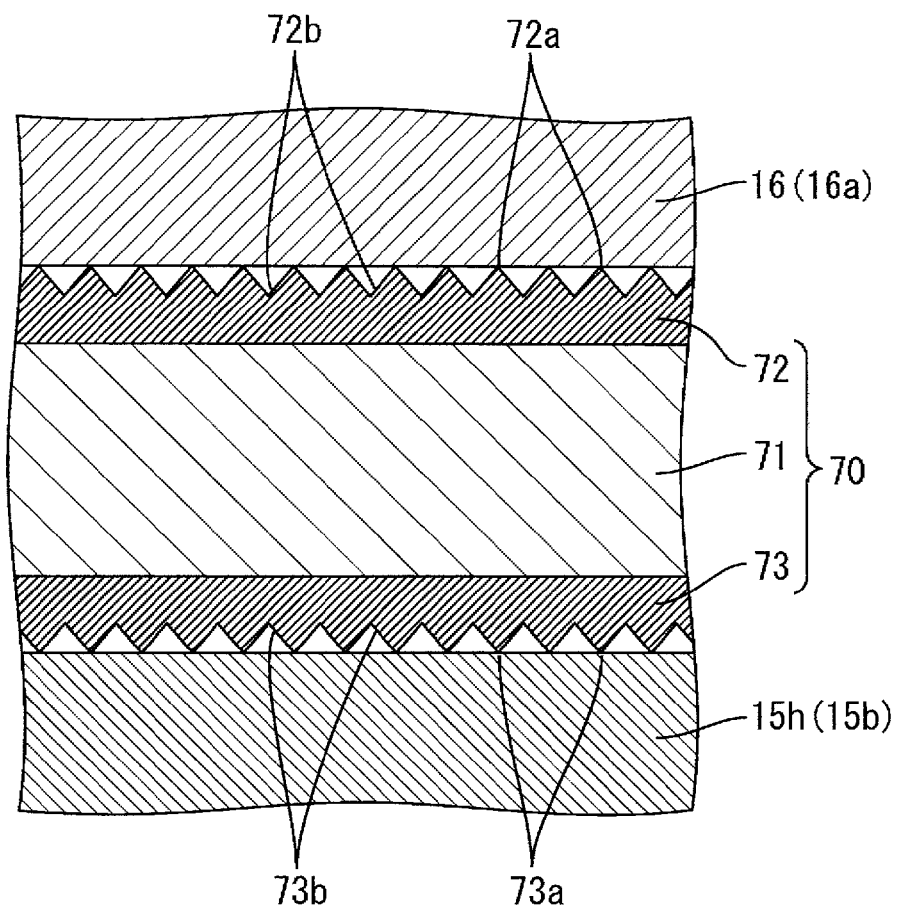
FIG. 5 is a cross-sectional view typically illustrating a configuration of a buffer provided in a backlight device.
Figure 6:
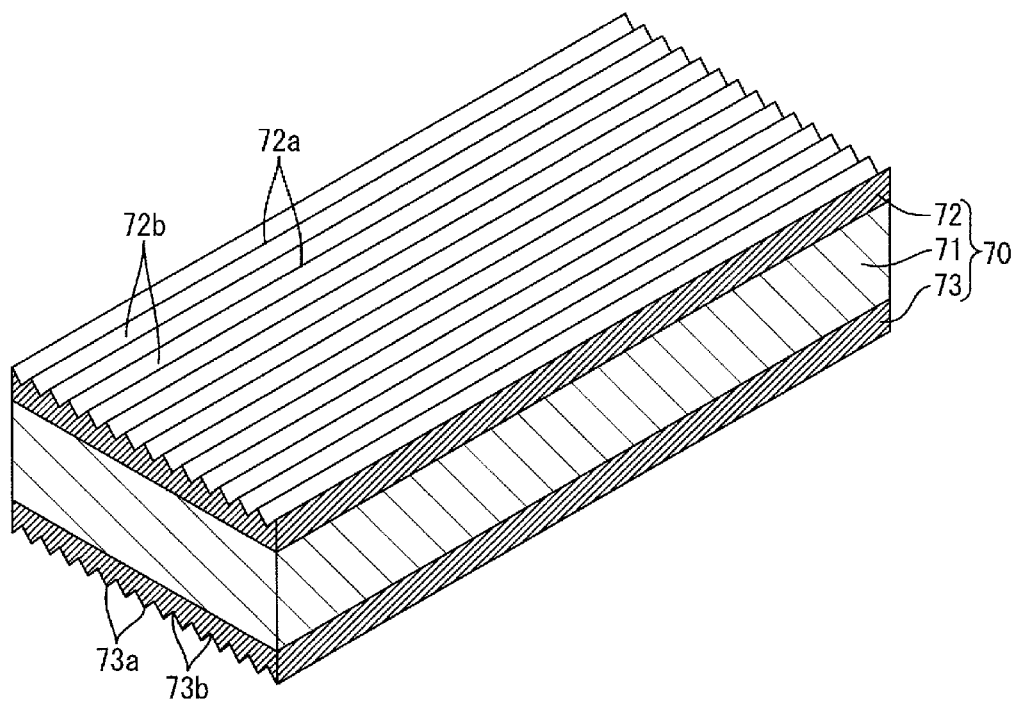
FIG. 6 is a perspective view typically illustrating a configuration of the buffer provided in the backlight device.
Figure 7:
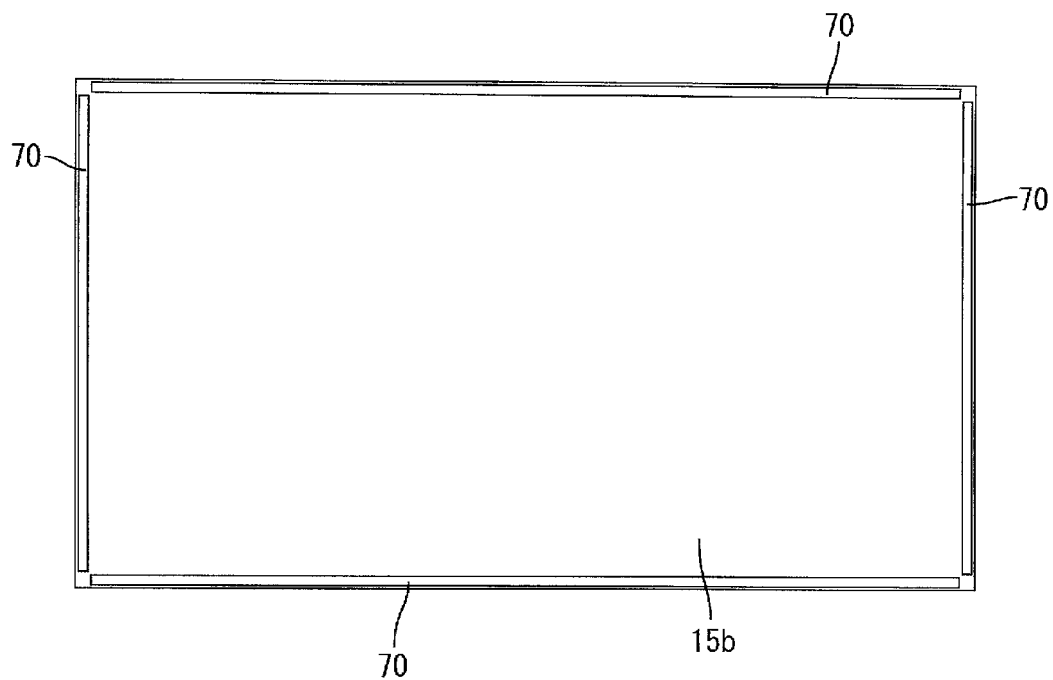
FIG. 7 is a conceptual view illustrating a planar arrangement of the buffer provided in the backlight device.

FIG. 1 is an exploded perspective view illustrating a general construction of the television receiver according to the first embodiment. FIG. 2 is an exploded perspective view illustrating a general construction of the liquid crystal display device provided in the television receiver shown in FIG. 1. FIG. 3 is an enlarged cross-sectional view illustrating a cross-sectional configuration of a main portion of the liquid crystal display device in FIG. 2 along the short-side direction. FIG. 4 is an enlarged cross-sectional view illustrating a cross-sectional configuration of a main portion of the liquid crystal display device in FIG. 2 along the long-side direction. FIG. 5 is an enlarged cross-sectional view illustrating a buffer provided in a lighting device. FIG. 6 is an enlarged perspective view illustrating the buffer. FIG. 7 is a conceptual view illustrating a planar arrangement of the buffer.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position. As illustrated in FIG. 2, it includes a liquid crystal panel 11 as a display panel, and a backlight device 12 (lighting device), which is an external light source. They are integrally held by a bezel 13 having a frame shape and the like.

Next, the liquid crystal panel 11 and the backlight device 12 included in the liquid crystal display device 10 will be explained (see FIGS. 2 to 4).

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, color filter having color sections such as R (red), G (green) and B (blue) color sections arranged in a predetermined pattern, counter electrodes, and an alignment film are provided. Polarizing plates 11a, 11b are attached to outer surfaces of the substrates (see FIGS. 3 and 4).

As illustrated in FIG. 2, the backlight device 12 includes a chassis 14, a diffuser plate 15a, an optical sheet set (optical member) 15b and long-side frames 16. The chassis 14 has a substantially box-shape and an opening 14b on the light output side (on the liquid crystal panel 11 side). The diffuser plate 15a is arranged so as to cover the opening 14b of the chassis 14. The optical sheet set (optical member) 15b is arranged on the light output side of the diffuser plate 15a. The long-side frames 16 are arranged along the long sides of the chassis 14. The diffuser plate 15a and the optical sheet set 15b are sandwiched between the chassis 14 and the frames 16. Cold cathode tubes (light sources) 17, lamp clips 18, relay connectors 19 and holders 20 are installed in the chassis 14. The lamp clips 18 hold the cold cathode tubes 17 at the chassis 14. Each relay connector 19 functions as a relay point of electrical connection at each end of the cold cathode tubes 17. The lamp holders 20 collectively cover the ends of the cold cathode tubes 17 and the relay connectors 19. In the backlight device 12, a side closer to the optical sheet set 15b than the cold cathode tubes 17 is a light output side. In the present embodiment, the light output side (a liquid crystal panel 11 side) of the optical sheet set 15b corresponds to a light output portion (light output surface) 15z (see FIG. 3 and FIG. 4).

The chassis 14 is made of metal. It is formed in a substantially shallow box shape with metal plating. It includes a rectangular bottom plate and outer rims (steps) 21 (short-side outer rims 21a and long-side outer rims 21b), each of which extends upright from the corresponding side of the bottom plate and has a substantially U shape and makes a step with the bottom plate. The bottom plate of the chassis 14 has a plurality of mounting holes 22 at two ends of the bottom plate in the long-side edges thereof. The relay connectors 19 are mounted in the mounting holes 22. As illustrated in FIG. 3, fixing holes 14c are provided in the upper surface of the chassis 14 along the long-side outer rims (steps) 21b to bind the bezel 13, the frames 16 and the chassis 14 together with screws and the like.

A light reflecting sheet 23 is disposed on an inner surface of the bottom plate of the chassis 14 (on a side that faces the cold cathode tubes 17). The light reflecting sheet 23 is a synthetic resin sheet having a surface in white color that provides high light reflectivity. It is placed so as to cover almost entire inner surface of the bottom plate of the chassis 14. As illustrated in FIG. 3, long-side edges of the light reflecting sheet 23 are lifted so as to cover the long-side outer rims (steps) 21b of the chassis 14 and sandwiched between the chassis 14 and the diffuser plate 15a. With this light reflecting sheet 23, light emitted from the cold cathode tubes 17 is reflected toward the diffuser plate 15a.

Each cold cathode tube (light source) 17 is a linear light source having an elongated tubular shape. A plurality of the cold cathode tubes 17 are installed in the chassis 14 such that they are arranged parallel to each other with the long-side direction thereof (the axial direction) aligned along the long-side direction of the chassis 14 (in a state of the parallel arrangement) (see FIG. 2). The cold cathode tubes 17 are provided in the chassis 14 so as to have a gap from the bottom plate of the chassis 14 (the reflecting sheet 23). Each end of the cold cathode tubes 17 is fitted to the relay connector 19 and the holder (cover) 20 is attached to the chassis 14 so as to cover the relay connectors 19.

The holders (covers) 20 are made of white synthetic resin that provides high light reflectivity. Each of them covers the ends of the cold cathode tubes 17 and has an elongated substantially box shape that extends along the short side of the chassis 14. As illustrated in FIG. 4, a part of the holder 20 is placed on top of a part of the corresponding short-side outer rim 21a of the chassis 14 and forms a side wall of the backlight device 12 together with the outer rim 21a. An insertion pin 24 projects from a surface of the holder 20 that faces the outer rim 21a of the chassis 14. The holder 20 is mounted to the chassis 14 by inserting the insertion pin 24 into the insertion hole 25 provided in the top surface of the outer rim 21a of the chassis 14.

The holder 20 includes two surfaces on a light output surface 15z side that are parallel to the bottom plate of the chassis 14. The short-side edge of the diffuser plate 15a is placed on a diffuser plate placing surface (first surface) 20a located at a lower level. A sloped cover 26 extends from the diffuser plate placing surface (first surface) 20a toward the bottom plate of the chassis 14. A short-side frame 16a that holds the liquid crystal panel 11 is placed on a second surface 20*b* of the holder 20. The short-side frame 16*a* is omitted in FIG. 2 for ensuring drawing visibility and the cold cathode tubes 17 are omitted in FIG. 4 for ensuring drawing visibility.

The diffuser plate 15*a* is formed in a rectangular shape. The short-side edge of four sides of the diffuser plate 15*a* is placed on the diffuser plate placing surface (first surface) 20*a* of the holder 20 and the long-side edge of the four sides of the diffuser plate 15*a* is placed on the outer rim (step) 21*b* of the chassis 14. The diffuser plate 15*a* is formed by a material that diffuses and transmits light from the cold cathode tubes 17. Specifically, the diffuser plate 15*a* includes a synthetic resin plate containing scattered light diffusing particles, and it diffuses linear light emitted from the cold cathode tubes 17 that are linear light sources (tubular light sources). The thickness of the diffuser plate 15*a* is 2 mm and the light transmission rate is 85%.

The optical sheet set 15*b* changes light emission properties (for example, a light-output angle or an in-plane brightness distribution and other properties) of light emitted from the cold cathode tubes 17, especially light that exists from the diffuser plate 15*a*. The optical sheet set 15*b* includes a lens sheet 15*c* that is provided adjacent to the diffuser plate 15*a*, diffuser sheets 15*d*, 15*e*, 15*f*, 15*g* and a reflecting type polarizing film 15*h* layered in this order from the diffuser plate 15*a* side. The optical sheet set 15*b* is formed in a rectangular shape like the diffuser plate 15*a*. The short-side edge of the optical sheet set 15*b* is held between the outer edge of the diffuser plate 15*a* and the long-side frame 16, and the long-side edge of the optical sheet set 15*b* is held between the outer edge of the diffuser plate 15*a* and the short-side frame 16*a*. In the present embodiment, the diffuser plate 15*a* corresponds to a first holding member that holds the optical sheet set 15*b* at the cold cathode tube 17 side and each of the long-side frame 16 and the short-side frame 16*a* corresponds to a second holding member that holds the optical sheet set 15*b* at the light-output surface 15*z* side.

The lens sheet 15*c* is configured to have a plurality of linear convex lenses (convex cylindrical lens, lenticular lens) in parallel to each other on a surface (light-output surface) of a light translucent base material of a synthetic resin. The linear convex lenses are arranged such that their longitudinal direction is parallel to the longitudinal direction of the cold cathode tubes 17. The thickness of the lens sheet 15*c* is 0.5 mm and a pitch of the convex lenses is 0.15 mm.

Each of the diffuser sheets 15*d*, 15*e*, 15*f*, 15*g* includes a light translucent base material of a synthetic resin and a diffuser layer containing scattered light diffusing particles. Each diffuser sheet is formed by providing the diffuser layer on the light translucent base material. The thickness of each diffuser sheet 15*d*, 15*e*, 15*f*, 15*g* is 0.22 mm and the thickness of the translucent base material is 0.188 mm.

In the optical sheet set 15*b*, a part of light that exits from the diffuser sheets 15*d*, 15*e*, 15*f*, 15*g* passes through the reflecting type polarizing film 15*h* having the light-output surface 15*z* (that is arranged to face the liquid crystal panel 11) and another part of the light is reflected by the reflecting type polarizing film 15*h*. The light reflecting type polarizing film 15*h* improves light use efficiency for the pixels of the liquid crystal panel 11. The reflected light is reused by reflection by the reflecting sheet 23 or the like.

A buffer 70 is provided between the reflecting type polarizing film 15*h* and each of the long-side frame 16 and the short-side frame 16*a*, as illustrated in FIGS. 3 and 4. The buffer 70 includes two plates 72, 73 formed of a synthetic resin such as an ester resin or an acrylic resin and a sponge-like formed member 71 formed of a urethane resin having modulus of elasticity higher than the plates 72, 73. The formed member 71 is held between the plates 72, 73 with an adhesive. Each plate 72, 73 has a rough surface on its outer surface and the rough surface is formed by a plurality of elongated concave portions (top portions) 72*a*, 73*a* and a plurality of elongated convex portions (bottom portions) 72*b*, 73*b* each of which extends in the longitudinal direction of the plate 72, 73 in the present embodiment. Each of the convex portions 72*a*, 73*a* and the concave portions 72*b*, 73*b* extends in a direction perpendicular to a contracting/expanding direction that is from a center to the outer edge side of the optical sheet set 15*b*. In other words, the convex portions 72*a*, 73*a* and the concave portions 72*b*, 73*b* are aligned in parallel to each other along the contracting/expanding direction that is from a center to the outer edge side of the optical sheet set 15*b*.

Each of the long-side frames 16 and the short-side frames 16*a* is a frame member formed of a synthetic resin and has a placing surface for receiving the liquid crystal panel 11 on an opposite side of the surface that holds the optical sheet set 15*b*. The long-side frames 16 and the short-side frames 16*a* and the bezel (third holding member) 13 that is provided on the backlight device 12 hold the liquid crystal panel 11 by sandwiching it therebetween. A buffer 60 is provided between each frame 16, 16*a* and the liquid crystal panel 11 respectively. The buffer 60 has a configuration same as the buffer 70.

In the present embodiment, the cold cathode tubes 17 are arranged in parallel to each other and accommodated in a space (light sources accommodation chamber) formed between the reflecting sheet 23 provided on the inner surface of the chassis 14 and the diffuser plate 15*a*. Each of the cold cathode tubes 17 used in the present embodiment has a tube diameter x of 4.0 mm. A distance y between the cold cathode tubes 17 and the reflecting sheet 23 is 0.8 mm. A distance z between the adjacent cold cathode tubes 17 is 16.4 mm. A distance w between the cold cathode tubes 17 and the diffuser plate 15*a* is 2.7 mm. Thus, a distance between the components of the backlight device 12 has been made smaller, and especially the distance between the cold cathode tubes 17 and the diffuser plate 15*a* and the distance between the cold cathode tubes 17 and the reflecting sheet 23 are made smaller. Because of the thickness reduction of the lighting device 12, the liquid crystal display device 10 and that of the television receiver TV are provided with the following thicknesses. The thickness of the liquid crystal display device 10 (i.e., the thickness between the front surface of the liquid crystal panel 11 and the back surface of the backlight device 12) is 16 mm. The thickness of the television receiver TV (i.e., the thickness between the front surface of the front cabinet Ca and the back surface of the rear cabinet Cb) is 34 mm. Namely, a thin television receiver is provided.

In the television receiver TV having the above configuration according to the present embodiment, the backlight device 12 of the liquid crystal display device 10 is configured such that the diffuser plate (first holding member) 15*a* and the long-side frames 16 (second holding member) hold the long-side ends of the optical sheet set 15*b* therebetween and the diffuser plate (first holding member) 15*a* and the short-side frames 16*a* (second holding member) hold the short-side ends of the optical sheet set 15*b* therebetween. Further, the buffer 70 is provided between the optical sheet set 15*b* and each long-side frame 16 and between the optical sheet set 15*b* and each short-side frame 16. Therefore, this prevents rattling between the optical sheet set 15*b* and the frame 16, 16*a* (the optical sheet set 15*b* and the frame 16, 16*a* rattle due to the gap generated therebetween) from occurring. The buffer 70 is configured such that at least a surface that is in contact with the optical sheet set 15*b* has a rough surface and the optical sheet set 15*b* moves freely to some extent. Therefore, even if the optical sheet set 15b is contracted or expanded due to heat from the cold cathode tubes 17, deflection is not caused in the optical sheet set 15b.

The buffer 70 absorbs impact or shock generated between the optical sheet set 15b and the long-side frame 16 or the short-side frame 16a and is formed of an elastic material such as a foamed polyurethane resin. Such an elastic material generally has great friction coefficient, and therefore if the buffer 70 is in contact with the optical sheet set 15b with their surfaces (flat surfaces), friction between them becomes great and the optical sheet set 15b cannot move freely (free movement of the optical sheet set 15b is restricted). However, in the present embodiment, the surface of the buffer 70 that abuts the optical sheet set 15b is a rough surface. This enables the optical sheet set 15b to move freely to some extent and any deflection is not caused in the optical sheet set 15b.

Figure 10:
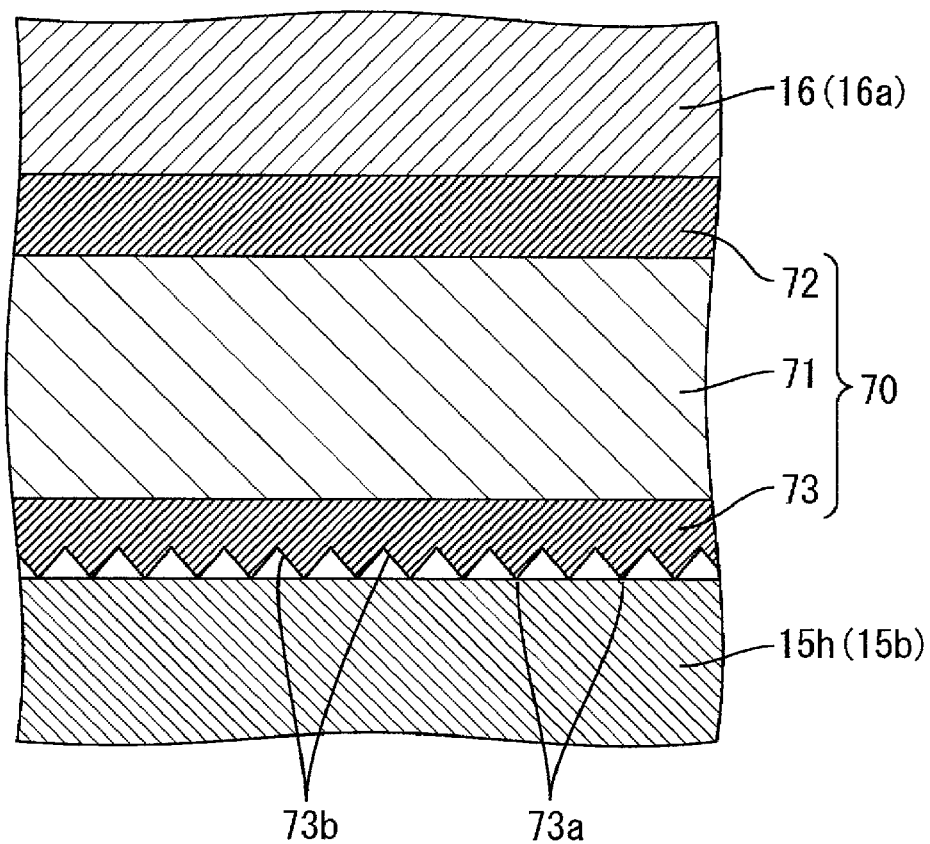
FIG. 10 is a cross-sectional view typically illustrating a configuration of a buffer according to another modified example.

In the present embodiment, as illustrated in FIGS. 5 and 6, the buffer 70 one of which is a surface closer to the optical sheet set 15b and another one of which is a surface closer to the long-side frame 16 or the short-side frame 16a. However, as illustrated in FIG. 10, the buffer 70 may be configured such that the rough surface is formed only on the surface closer to the optical sheet set 15b and no rough surface is formed on the surface closer to the long-side frame 16 or the short-side frame 16a.

In the present embodiment, the buffer 70 is provided along the four outer edges of the optical sheet set 15b as illustrated in FIG. 7. However, the buffer 70 may be provided only along the long-side edges or only along the short-side edges.

Figure 8:
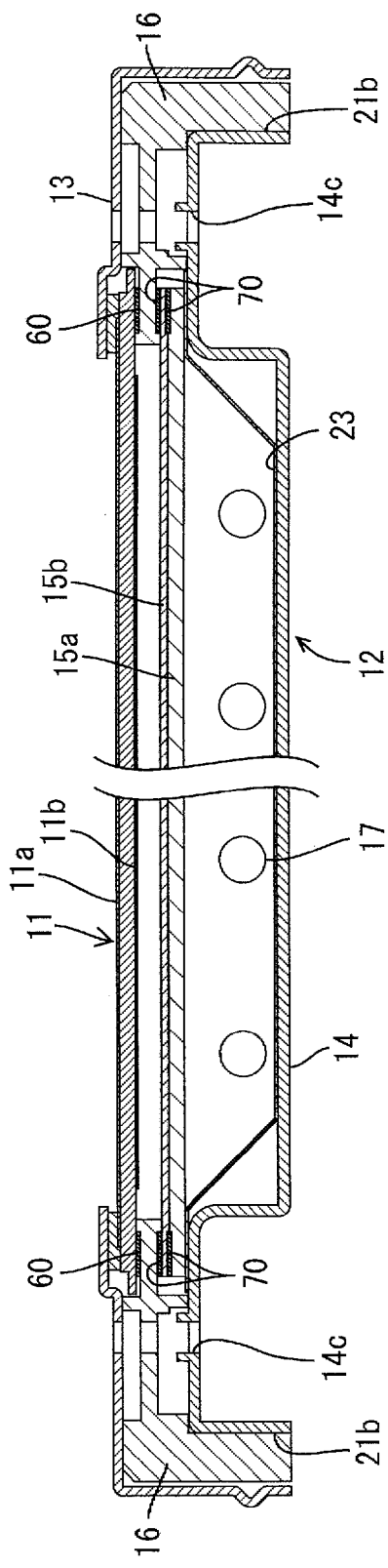
FIG. 8 is a cross-sectional view illustrating a liquid crystal display device according to one modified example.

In the present embodiment, the buffer 70 is provided between the optical sheet set 15b and the long-side frames 16 and the short-side frames 16a that hold the optical sheet set 15b. However, as illustrated in FIG. 8, the buffer 70 configured as illustrated in FIGS. 5 and 6 may be provided between the optical sheet set 15b and the diffuser plate 15a that is another holding member. In such a case, occurrence of rattling and deflection is prevented more effectively.

Figure 11:
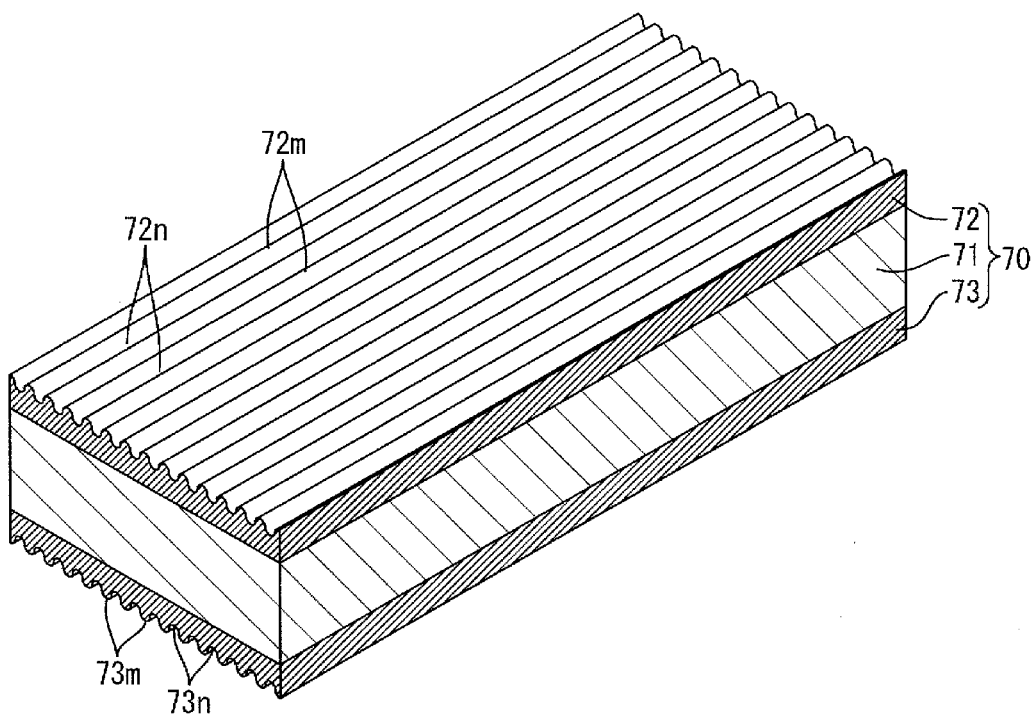
FIG. 11 is a perspective view typically illustrating a buffer according to an additional modified example.
Figure 12:
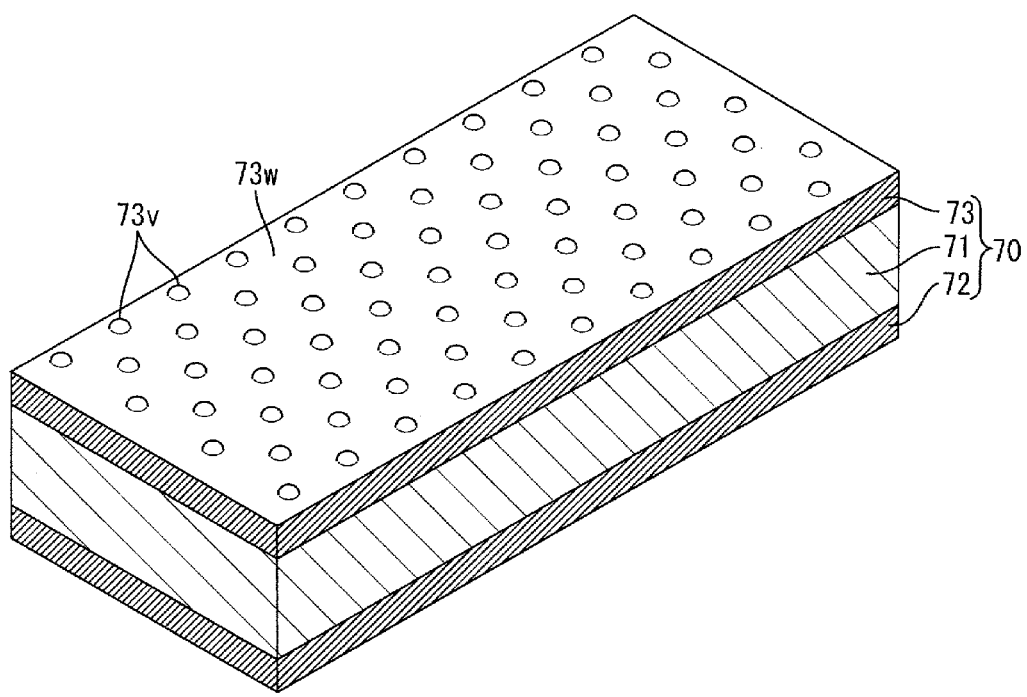
FIG. 12 is a perspective view typically illustrating a buffer according to an additional modified example.

In the present embodiment, the top portions of the convex portions 72a, 73a and the bottom portions of the concave portions 72b, 73b are formed to be angled. However, as illustrated in FIG. 11, the rough surface may be formed by convex portions 72m, 73m having curved top portions (a hemisphere shape) and concave portions 72n, 73n having curved bottom portions (a hemisphere shape).

Figure 9:
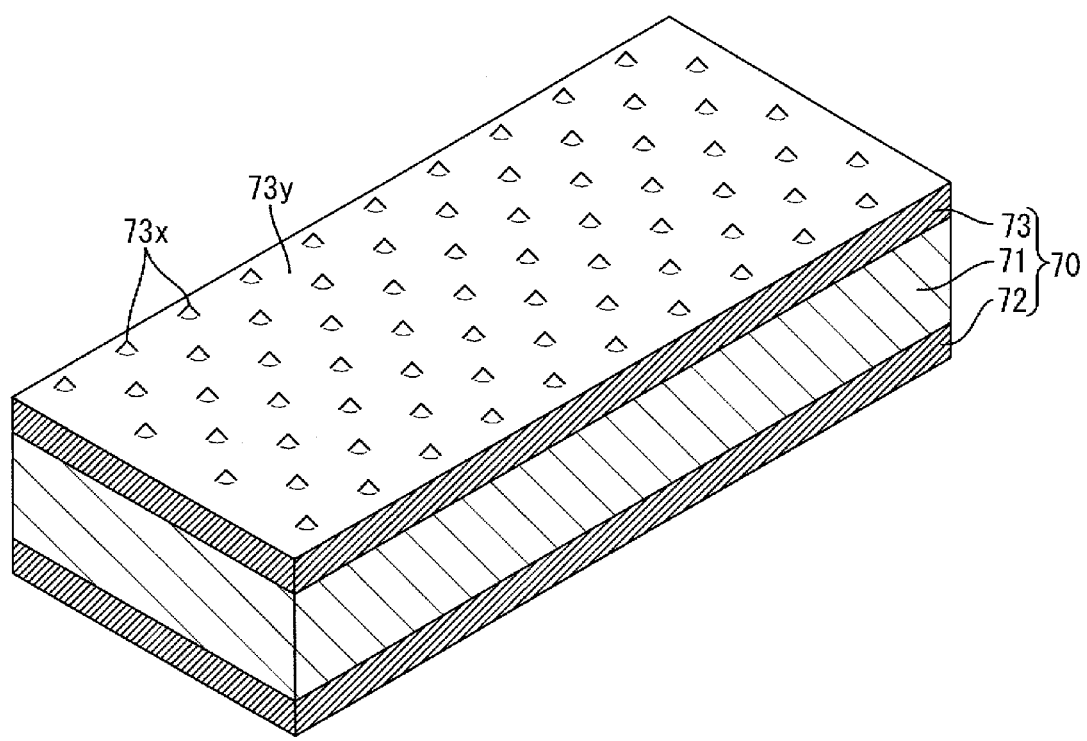
FIG. 9 is a perspective view typically illustrating a configuration of a buffer according to one modified example.

In the present embodiment, the surface of the buffer 70 that is in contact with the optical sheet set 15b is formed to be the rough surface having the elongated convex portions and concave portions alternately. However, as illustrated in FIG. 9, the contact surface of the buffer 70 may be formed to be a projection dotted surface. The buffer 70 is configured such that projections 72x, 73x are dotted on surfaces 72y, 73y of the plates 72, 73 to prevent or suppress occurrence of the deflection of the optical sheet set 15b. The projections 72x, 73x may be formed to have curved top surfaces (hemisphere shapes) as projections 72v, 73v.

In the present embodiment, the rough surface is formed by the elongated convex portions (top portions) 72a, 73a extending in the longitudinal direction of the buffer 70 and the elongated concave portions (bottom portions) 72b, 73b. However, the rough surface can be formed only by forming the elongated convex portions (top portions) on a flat surface. Namely, the concave portions (bottom portions) are not required to be formed and point contact between the buffer 70 and the optical sheet set 15b can be achieved by forming at least the convex portions.

Further, in the present embodiment, following modification can be made.

(1) The cold cathode tubes are used as the light sources; however, other types of discharge tubes including hot cathode tubes can be used.

(2) The diffuser plate 15a is placed on the outer rims 21b (steps) 21b of the chassis 14 and the first surfaces 20a of the holder 20. However, the component provided on the outer rim (step) 21b of the chassis 14 and the first surface 20a of the holder 20 is not limited to the diffuser plate 15a, as long as the component has a thickness greater than the optical sheet set 15b and is capable of holding the optical sheet set 15b with the frames 16, 16a.

(3) A light output side surface of the reflecting type polarizing film 15h corresponds to the light output surface (light output portion) 15z of the backlight device (lighting device) 12. The light output portion is provided on an opposing surface of a component that is opposed to the component to be illuminated. Therefore, for example when the optical sheet such as a diffuser sheet is provided on the light output side, the light output side of the optical sheet corresponds to the light output portion and the optical sheet is held by the frames 16, 16a having the buffer between the optical sheet and the frames 16, 16a.

The invention claimed is:

1. A lighting device having a light output portion from which light is output, the lighting device comprising:
    a light source; and
    an optical member provided on the light output portion side with respect to the light source, wherein:
    the optical member is held by a pair of holding members;
    the holding members include a first holding member that holds the optical member on the light source side and a second holding member that holds the optical member on an opposite side from the light source side;
    a buffer is provided in at least one of a space between the optical member and the first holding member and a space between the optical member and the second holding member;
    the buffer has at least one rough surface on a side that abuts the optical member;
    the buffer includes a pair of plates and a formed member having a modulus of elasticity higher than the plates and being held between the plates; and
    an outer surface of at least one of the pair of plates defines the at least one rough surface.

2. The lighting device according to claim 1, wherein:
    a surface of the second holding member that is on an opposite side from the optical member side is a supporting portion for supporting an object to be illuminated; and
    the lighting device further comprising a third holding member for holding the object to be illuminated together with the supporting portion of the second holding member by sandwiching the object therebetween.

3. The lighting device according to claim 1, further comprising a rectangular chassis that accommodates the light source, wherein:
    two outer rims of the chassis parallel to each other have steps, respectively, the steps being formed by bending the chassis so as to project toward the light output portion side;
    a diffuser plate that diffuses light from the light source is placed on surfaces of the steps on the light output portion side; and
    the diffuser plate functions as the first holding member to hold the optical member with an outer edge portion thereof together with the second holding member by sandwiching the optical member therebetween.

4. The lighting device according to claim 3, wherein the diffuser plate has a relatively larger thickness than the optical member.

5. The lighting device according to claim 1, further comprising a rectangular chassis that accommodates the light source, wherein:
- the light source is linear light sources;
- the chassis has an elongated shape;
- the light sources are arranged in parallel to each other such that an axial direction of the light sources matches a longitudinal direction of the chassis;
- covers that are provided in pair and each of which extends in a short-side direction of the chassis cover ends of the light sources that are arranged in parallel to each other;
- a diffuser plate that diffuses light from the light sources is provided on the light output portion side surfaces of the covers; and
- the diffuser plate functions as the first holding member so as to hold the optical member with an outer edge portion thereof together with the second holding member by sandwiching the optical member therebetween.

6. The lighting device according to claim 1, wherein the optical member includes a reflecting type polarizing sheet.

7. A display device comprising:
- the lighting device according to claim 1; and
- a display panel configured to provide display using light from the lighting device.

8. The display device according to claim 7, wherein the display panel is a liquid crystal display using liquid crystal.

9. A television receiver comprising the display device according to claim 7.

* * * * *